(12) United States Patent
Goodman et al.

(10) Patent No.: US 12,200,143 B2
(45) Date of Patent: Jan. 14, 2025

(54) DETERMINISTIC CERTIFICATE EXPIRATION IN DISSAGGREGATED ENVIRONMENTS

(71) Applicant: Dell Products L.P., Round Rock, TX (US)

(72) Inventors: Bradley K. Goodman, Nashua, NH (US); Kirk Alan Hutchinson, Londonderry, NH (US)

(73) Assignee: Dell Products L.P., Round Rock, TX (US)

(*) Notice: Subject to any disclaimer, the term of this patent is extended or adjusted under 35 U.S.C. 154(b) by 407 days.

(21) Appl. No.: 17/725,309

(22) Filed: Apr. 20, 2022

(65) Prior Publication Data

US 2023/0344651 A1 Oct. 26, 2023

(51) Int. Cl.
*H04L 9/32* (2006.01)

(52) U.S. Cl.
CPC .......... *H04L 9/3268* (2013.01); *H04L 9/3297* (2013.01)

(58) Field of Classification Search
None
See application file for complete search history.

(56) References Cited

U.S. PATENT DOCUMENTS

| | | | | |
|---|---|---|---|---|
| 2003/0093676 A1* | 5/2003 | Kawamura | ........... | H04L 9/3263 713/175 |
| 2005/0257058 A1* | 11/2005 | Yoshida | ................ | H04L 9/0891 713/175 |
| 2006/0059333 A1* | 3/2006 | Gentry | ................. | H04L 9/3236 713/156 |
| 2015/0334109 A1* | 11/2015 | Kasai | ........................ | H04L 9/40 358/1.14 |
| 2022/0116229 A1* | 4/2022 | Jones | .................... | H04L 9/3247 |
| 2022/0131711 A1* | 4/2022 | Jatti | ....................... | H04L 9/3268 |

* cited by examiner

*Primary Examiner* — Nelson S. Giddins
(74) *Attorney, Agent, or Firm* — Womble Bond Dickinson (US) LLP

(57) ABSTRACT

Methods and systems for certificate management in a distributed system are disclosed. The distributed system may include data processing systems that utilize certificates issued by a certificate issuer. The data processing systems may be intermittently connected to the certificate issuer. The certificate issuer may, at any point in time, revoke any issued certificate. The certificate issuer may not notify other entities of the revocation. To determine whether a certificate should be treated as being valid, the data processing systems may apply a set of rules to the certificate that compensate for intermittent connectivity to the certificate issuer that may prevent determining whether a certificate has been revoked, while limiting risk due to the potential for a certificate to have been revoked but the revocation not being known.

20 Claims, 17 Drawing Sheets

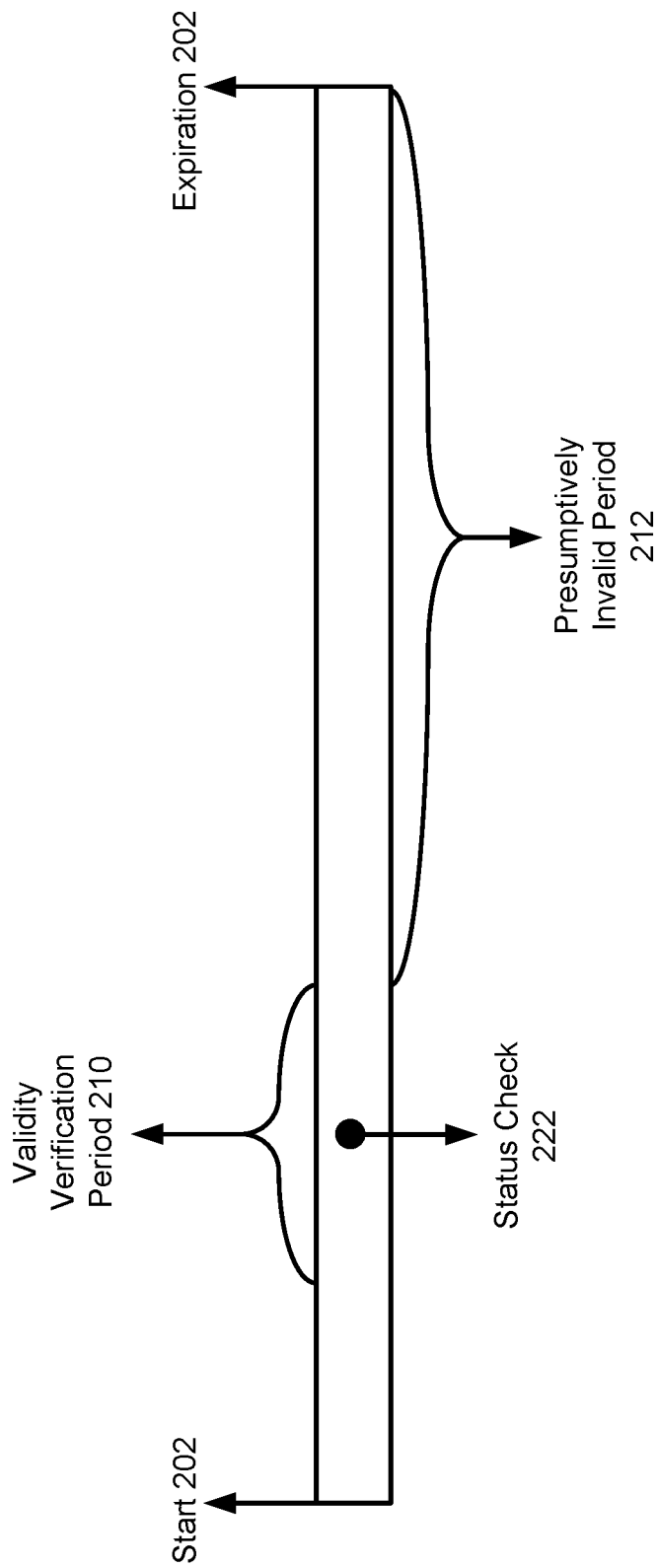

DETERMINISTIC CERTIFICATE EXPIRATION IN DISSAGGREGATED ENVIRONMENTS

FIELD OF THE DISCLOSED EMBODIMENTS

Embodiments disclosed herein relate generally to trust management. More particularly, embodiments disclosed herein relate to systems and methods for management of certificates for trust management in distributed systems.

BACKGROUND

Computing devices may store data and used stored data. For example, computing devices may utilize data when providing computer implemented services. Different computing devices may perform similar and/or different functions. To operate as a distributed system, all or a portions of the computing devices may need to be able to verify communications from the other computing devices.

BRIEF DESCRIPTION OF THE DRAWINGS

Embodiments disclosed herein are illustrated by way of example and not limitation in the figures of the accompanying drawings in which like references indicate similar elements.

FIGS. 2A-2H shows block diagrams illustrating life cycles of certificates in accordance with an embodiment.

DETAILED DESCRIPTION

Figure 1:
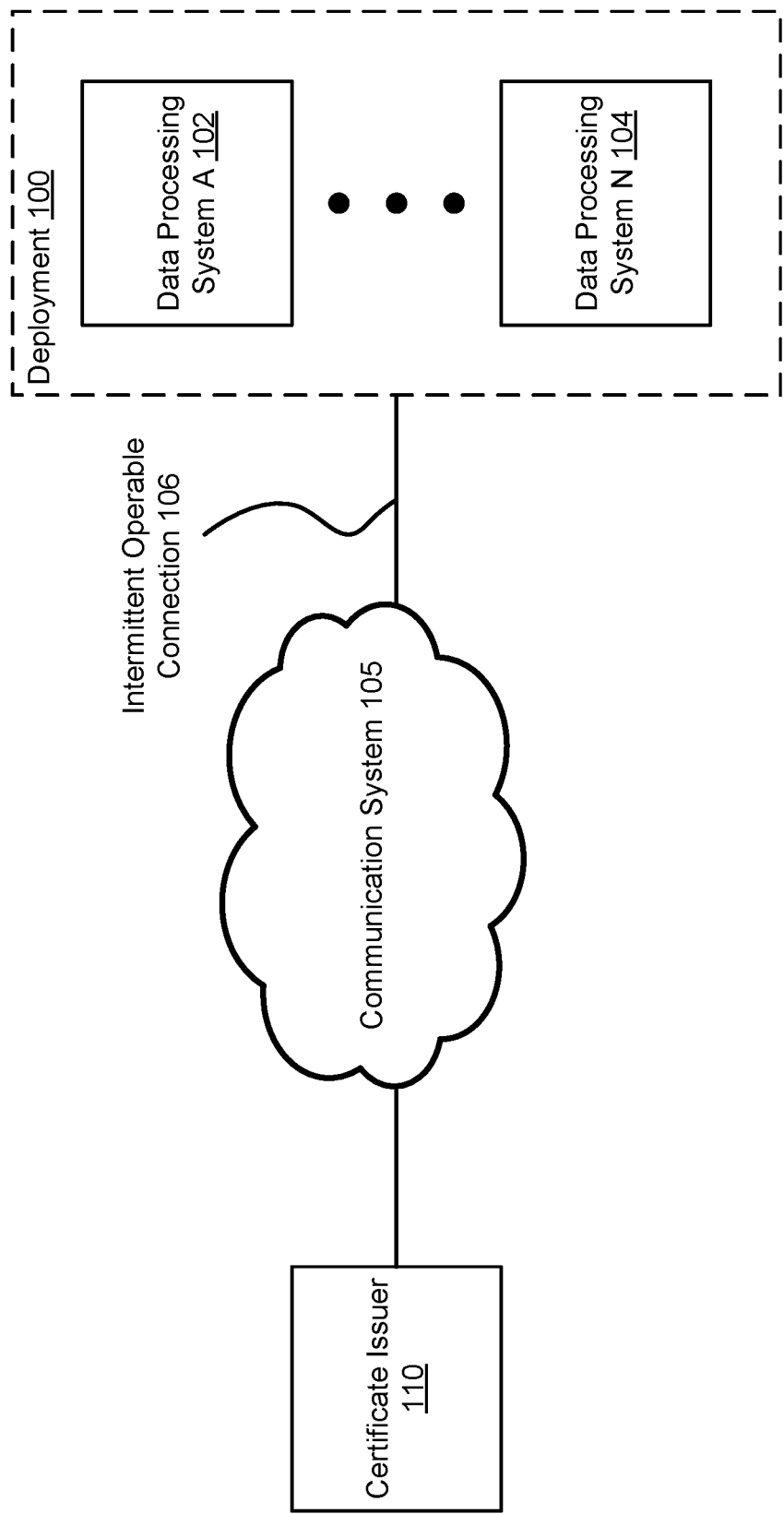
FIG. 1 shows a block diagram illustrating a data processing system in accordance with an embodiment.

Various embodiments and aspects disclosed herein will be described with reference to details discussed below, and the accompanying drawings will illustrate the various embodiments. The following description and drawings are illustrative of the embodiments disclosed herein and are not to be construed as limiting the embodiments disclosed herein. Numerous specific details are described to provide a thorough understanding of various embodiments of embodiments disclosed herein. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment disclosed herein. The appearances of the phrase "in one embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for certificate management in a distributed system. The distributed system may include data processing systems that utilize certificates issued by a certificate issuer. The data processing systems may be intermittently connected to the certificate issuer.

The certificate issuer may, at any point in time, revoke any issued certificate. However, the certificate issuer may not notify other entities of the revocation. Rather, the certificate issuer may supply information regarding revoked certificates when requested by other entities.

To determine whether a certificate should be treated as being valid, the data processing systems may apply a set of rules to the certificate that compensate for intermittent connectivity to the certificate issuer that may prevent determining whether a certificate has been revoked, while limiting risk due to the potential for a certificate to have been revoked but the revocation not being known. The set of rules may take into account various checks regarding the revocation status of the certificate that may have been performed in the past.

By doing so, embodiments disclosed herein may facilitate use of certificates in systems that may not be able to verify the revocation status of the certificates at all point in time. Thus, the disclosed embodiments may provide for the improvement of distributed systems which may utilize certificates in their operation. By improving the utility of certificates in distributed systems, distributed systems may be able to be used in a wider variety of scenarios including, for example, systems where operable connectivity between the components is limited.

In an embodiment, a computer-implemented method for managing certificates in distributed environments comprising a certificate issuer intermittently operably connected to data processing systems is provided. The method may include identifying, by a data processing system of the data processing systems, a certificate check event for a certificate issued by the certificate issuer; identifying, by the data processing system, a validity verification period for the certificate; identifying, by the data processing system, a check for the validity verification period, the check requiring that the data processing system communicate with the certificate issuer during the validity verification period; making a determination that the check is not passed; based on the determination: identifying an end of the validity verification period; making a second determination, based on the identified end of the validity verification period, that the validity verification period is not over; based on the second determination: treating the certificate as being valid.

The computer-implemented method may also include identifying, by the data processing system, a second certificate check event for the certificate; making a third determination that the check is not passed; based on the third determination: making a fourth determination, based on the identified end of the validity verification period, that the validity verification period is over; based on the fourth determination: treating the certificate as being invalid while the certificate has not expired; and performing an action set to attempt to remediate the check to update validity treatment of the certificate.

The action set may include performing one or more actions to update an outcome of the check; and treating the certificate as valid when the updated outcome of the check indicates that the check is passed.

The computer-implemented method may further include identifying, by the data processing system, a second certificate check event for the certificate; making a third determination that the check is passed; based on the third determination: treating the certificate as being valid; and establishing a new validity verification period.

The new validity verification period may begin at a point in time associated with the check being passed and ending after an end of the validity verification period.

The check may include verifying, with the certificate issuer, a revocation status of the certificate, the check is treated as being passed when the revocation status indicates that the certificate has not been revoked, and the check is treated as not being passed when the revocation status indicates that the certificate has been revoked.

The check may include verifying, with the certificate issuer, whether a revocation status of the certificate has been updated during the validity verification period, the check is treated as being passed when the revocation status has been updated during the validity verification period, and the check is treated as being no passed when the revocation status has not been updated during the validity verification period.

The check may include verifying, with the certificate issuer, a revocation status of the certificate; and verifying, with the certificate issuer, whether the revocation status of the certificate has been updated during the validity verification period, the check is treated as being passed when the revocation status indicates that the certificate has not been revoked and the revocation status has been updated during the validity verification period, and the check is treated as not being passed when the revocation status indicates that the certificate has been revoked or the revocation status has not been updated during the validity verification period.

The certificate check event may include conditional performance of an action that is tied to validity of the certificate.

The data processing system may be unable to communicate with the certificate issuer during a portion of the validity verification period.

A non-transitory media may include instructions that when executed by a processor cause the computer-implemented method to be performed.

A data processing system may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may facilitate performance of workloads (e.g., computer-implemented workloads performed by executing computing instructions with at least one processor of one or more data processing systems). The system may include, but is not limited to deployment 100.

Deployments 100 may include any number of data processing systems that provide the computer implemented services. For example, deployment 100 may include one or more data processing systems 102, 104 that may independently and/or cooperatively provide the computer implemented services.

For example, all, or a portion, of data processing systems 102-104 may provide computer implemented services to users and/or other computing devices operably connected to deployment 100. The computer implemented services may include any type and quantity of services including, for example, database services, instant messaging services, video conferencing services, etc. Different systems may provide similar and/or different computer implemented services.

Due to the distributed nature of the system illustrated in FIG. 1, data processing systems 102-104 may implement processes for (i) command and control (e.g., determining whether to follow a request, action, instruction, etc.), (ii) verify whether communications are authentic, and/or (iii) perform other types of processes to manage coordination within the environment. To do so, data processing systems 102-104 may utilize cryptographic certificates (also referred to as "certificates").

A certificate may be a data structure usable to ascertain whether certain actions should be performed. For example, the certificate may include information usable to prove that a public key is valid. The certificate may include information about the public key, information about the identity of the owner of the key, and a digital signature of an entity (e.g., an issuer of the certificate). that has verified the certificates contents. An entity that receives the certificate and trusts the certificate issuer may use the certificate to verify whether data structures signed with a private key corresponding to the public key are from a particular entity associated with the public/private key. If the entity is trusted, then acts, instructions, etc. in the data structure may also be trusted.

The system of FIG. 1 may also include certificate issuer 110. Certificate issuer 110 may be trusted by deployment 100 and may issue certificates on behalf of other entities. Thus, the certificates provided by certificate issuer 110 may be utilized by any of data processing systems 102-104 for a range of purposes, as noted above.

The certificates issued by certificate issuer 110 may be revoked prior to its expiration for a range of different reasons. Accordingly, after a certificate is obtained by data processing systems 102-104, the certificate may be revoked. Generally, certificate issuer 110 may not notify other entities that rely on the validity of the certificates. To allow holders of certificates to ascertain whether a previously obtained certificate is valid, certificate issuer 110 (or other entities acting on its behalf) may provide information regarding the status of certificates in response to requests for such information.

To check the status of certificates (e.g., to perform a check), one of data processing systems 102-104 may need to communicate with certificate issuer 110 via communication system. However, deployment 100 may only be in intermittent operable connection with certificate issuer. For example, an intermittent operable connection 106 relied upon for communication between deployment 100 and certificate issuer 110 may not always be available. Thus, any of data processing systems 102-104 may be unable to communicate with certificate issuer 110, thereby preventing the data processing systems from ascertaining whether a previously obtained certificate that has not yet expired is valid or invalid (e.g., revoked).

In general, embodiments disclosed herein relate to systems, methods, and devices for managing certificates in distributed systems where certificate issuers and certificate holders may be unable to communicate with one another during periods of time. To manage the certificates, data processing systems 102-104 may perform various actions for determining whether an unexpired certificate is valid or invalid.

For example, any of data processing systems 102-104 may (i) presume that unexpired certificates are valid unless revoked during certain periods of time, (ii) presume that unexpired certificates are invalid unless certain checks for the certificates are passed during the certain periods of times, and (iii) when an unexpired certificate is presumed invalid for failing to pass certain checks, take remedial action to ascertain the actual status of the unexpired certificates while treating the unexpired certificates as being invalid. Certificates that are presumed valid and invalid may be treated as being valid or invalid, respectively. Refer to FIGS. 2A-2H for additional details regarding treatment of certificates.

By doing so, embodiments disclosed herein may facilitate (i) revocation of certificates as-needed, (ii) assurance that in the case revocation was interrupted (e.g., due to lack of connectivity), certificates would automatically cease to work, (iii) any certificates (or signing systems) which were kept offline (e.g., "dark") would be useless from a authorizing perspective after the certificates are presumed invalid, (iv) remove needs for processes such as regeneration and redistribution of certificates on a regular basis in high security situations, (v) secure identification of an individual (and an individual's public cryptographic key) for the purposes of assuring that any permissions bestowed upon that key will only be conveyed to the proper intended individual, (vi) Provide for the ability to prevent theft or compromise of a key by permitting management of keys and therefore of key management policies, themselves, (vii) provide for the Ability for a system to guarantee that only public keys which have been properly vetted can be used, (viii) provide for the ability for a system to ensure that only public keys generated and managed via certain methods or practices may be used, (ix) provide for the ability for an administrator to mandate key handling practices, and/or (x) provide for the ability for an administrator to mandate key practices for given operations or other discrete portions of a larger system.

Any of certificate issuer 110 and deployment 100 may be implemented using a data processing system (e.g., a computing device) such as a host or server, a personal computer (e.g., desktops, laptops, and tablets), a "thin" client, a personal digital assistant (PDA), a Web enabled appliance, or a mobile phone (e.g., Smartphone), or any other type of data processing device or system. For additional details regarding data processing systems, refer to FIG. 5.

Any of certificate issuer 110 and deployment 100 may be implemented with multiple data processing systems. The data processing systems may form a distributed system operably connected via one or more networks. The distributed system may implement a control plane with may manage the operation of the data processing systems to provide the functionality of these entities. The control plane may be implemented with any number of applications hosted by the data processing systems. As part of the control plane, the certificates issued by certificate issuer 110 may be used to ascertain whether actions should be performed (e.g., by verifying signed data structures indicating that such actions are to be performed).

The functionality of certificate issuer 110 may be performed, in part, as a shared service (e.g., distributed application). For example, the shared service may include agents hosted by various deployments (not shown) or other computing systems (not shown).

Figure 3:
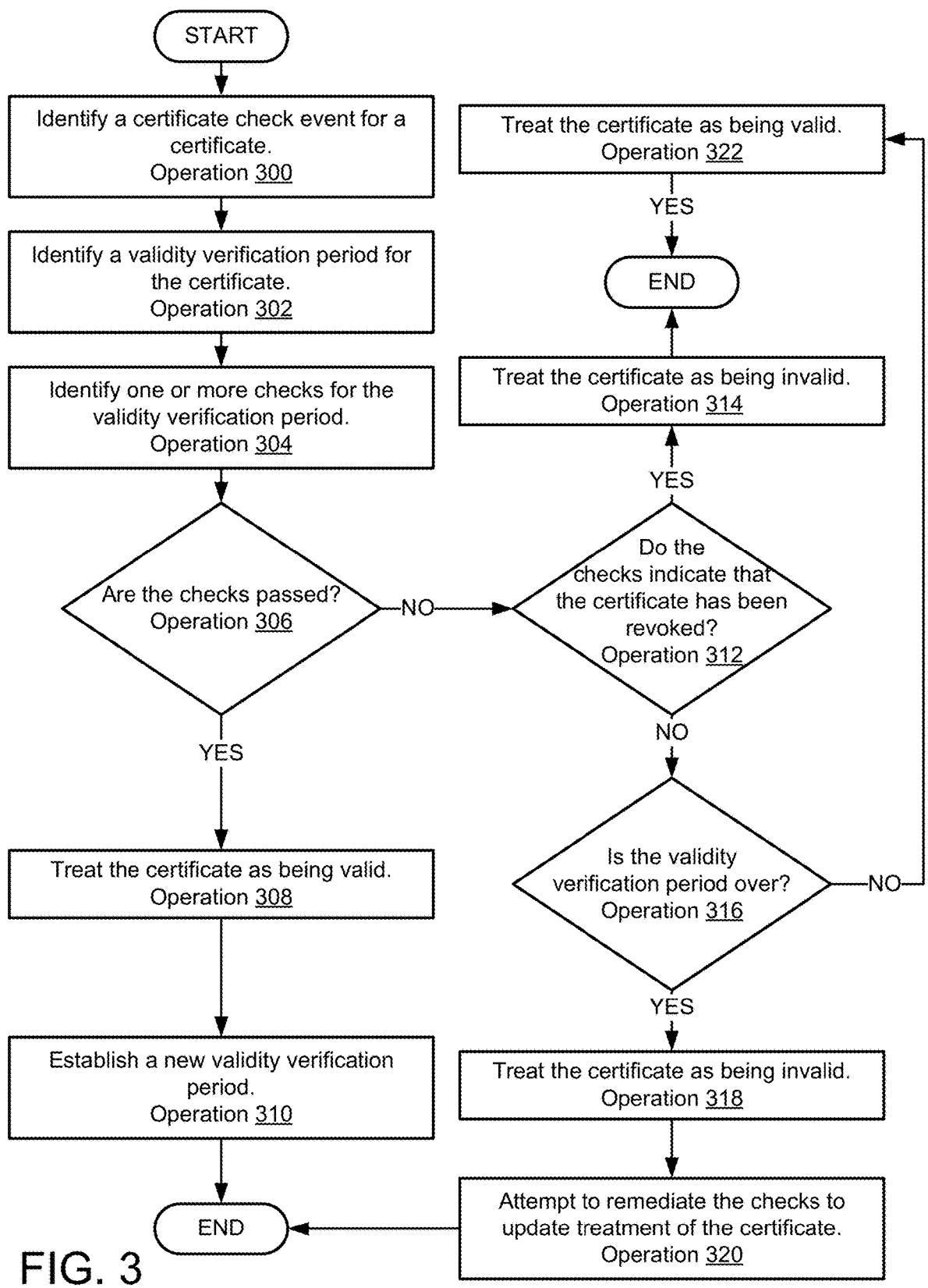
FIG. 3 shows a flow diagram illustrating a method of managing certificates in a distributed system in accordance with an embodiment.

Certificate issuer 110 and/or deployment 100 may perform all, or a portion, of the methods illustrated in FIG. 3.

Any of the components illustrated in FIG. 1 may be operably connected to each other (and/or components not illustrated) with a communication system 105. In an embodiment, communication system 105 includes one or more networks that facilitate communication between any number of components. The networks may include wired networks and/or wireless networks (e.g., and/or the Internet). The networks may operate in accordance with any number and types of communication protocols (e.g., such as the internet protocol). Communication system 105 and/or components connected to it may be continuously or intermittently connected.

For example, communication system 105 may include an intermittent air gap (e.g., for security or lack of infrastructure) between various portions of it which may limit communications between deployment 100 and certificate issuer 110.

While illustrated in FIG. 1 as included a limited number of specific components, a system in accordance with an embodiment may include fewer, additional, and/or different components than those illustrated therein.

As discussed above, the system of FIG. 1 may utilize certificates to manage the operation of data processing systems 102-104. As part of that process, the validity of any certificate may need to be determined. Generally, a certificate, when issued, may indicate that it is valid up until an expiration date. However, between issuance and expiration, the certificate may be revoked by the issuer thereby rendering it invalid. Further, because the data processing systems may not always be able to communicate with the certificate issuer (or its agents), the data processing systems may perform enforce certain rules on the certificates to ascertain whether the certificates are to be treated as valid or invalid. These rules may include (i) presuming that certificates are valid during certain periods of time unless verified as being revoked by the issuer and (ii) presuming that certificates are invalid during other periods of time unless verified as not being revoked and/or had its revocation status updated prior to these other periods of time. Other results may also be applied for analysis of certificates.

To further clarify validity analysis of certificates performed by data processing systems, FIGS. 2A-2H shows diagrams illustrating a life of a certificate from issuance (e.g., start 200) to expiration 202. In the figures, various periods of time are shown and the outcomes of certain checks are shown that may dictate how certificates are treated (e.g., as being valid or invalid).

Figure 2A:
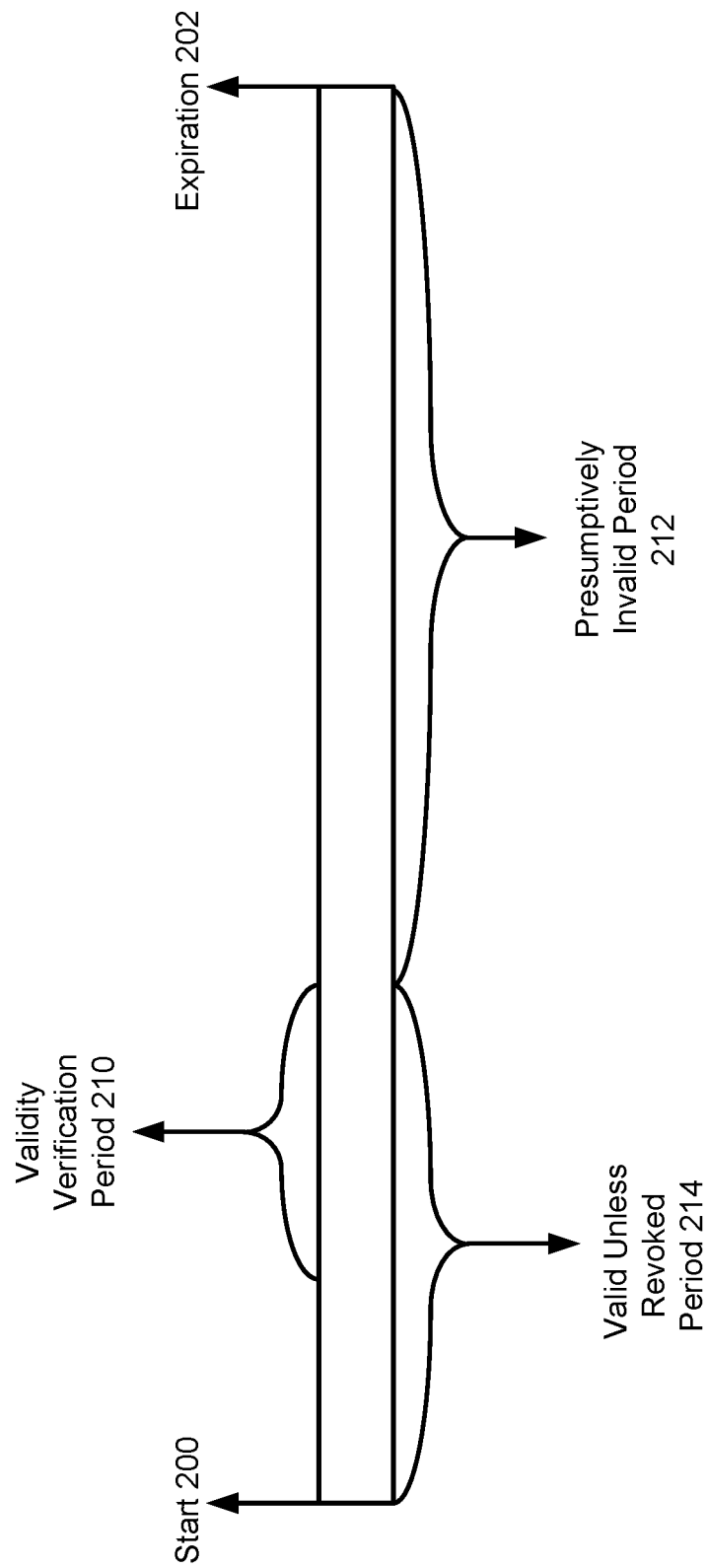

Turning to FIG. 2A, a first diagram of a lifetime of a certificate in accordance with an embodiment is shown. After the start 200 of the certificate, the certificate itself may generally indicate that it is valid until its expiration. However, the issuer of the certificate may revoke the certificate at any point in time, which is not reflected in the certificate itself.

To determine whether an unexpired certificate is valid, the data processing systems may divide the life of a certificate into a number of periods, including a valid unless revoked period 214, a validity verification period 210, and a presumptively invalid period. The presumptively invalid period 212 may follow the validity verification period 210.

During the validity verification period 210, the data processing systems may treat the certificate as being valid unless certain checks performed with respect to the certificate and during the validity verification period 210 are not passed. Thus, even if the checks are not performed during validity verification period 210, the certificate may be treated as being valid. By treating the certificate in this manner, the impact of the intermittent ability to communicate with the certificate may be reduced.

In contrast, during the presumptively invalid period 212, the certificate may be treated as being invalid (even prior to expiration 202) unless the checks are both performed and passed during the validity verification period. By doing so, certificates may automatically be invalidated even though it has not been confirmed that a certificate issuer has revoked the certificate. Consequently, certificates may be managed in a manner that facilitates both control and flexibility of control in distributed systems that may limit the ability of information regarding the revocation status of certificates to be obtained.

Figure 2B:
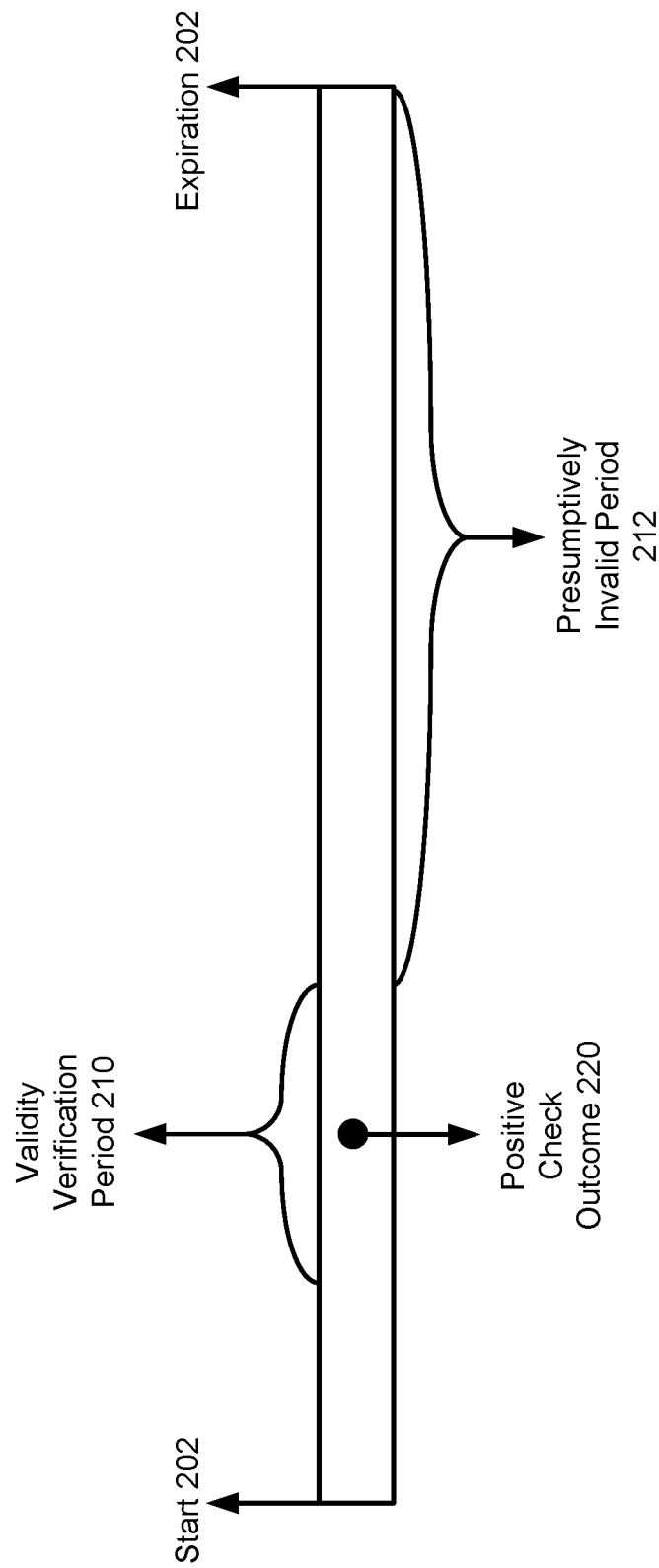

Turning to FIG. 2B, a second diagram of a lifetime of a certificate in accordance with an embodiment is shown. To ascertain whether a certificate should be treated as valid, the data processing systems may perform one or more checks during validity verification period 210. The checks may include (i) determining whether a certificate issuer has revoked the certificate and (ii) determining whether the certificate issuer has updated the revocation status of the certificate (e.g., indicated that it has considered whether the certificate should be revoked). These checks may be performed through communication with the certificate issuer. If the checks cannot be performed due to inability to communicate with the certificate issuer, the checks may be treated as not being passed.

Now consider a scenario, as illustrated in FIG. 2B, where a data processing systems performs the checks and receives a positive check outcome 220. In FIG. 2B, the location of the filled circle indicate that the check was performed during the validity verification period.

In this scenario, the data processing system may respond to the positive check outcome 220 by modifying resetting the validity verification period 210 and presumptively invalid period 212.

Figure 2C:
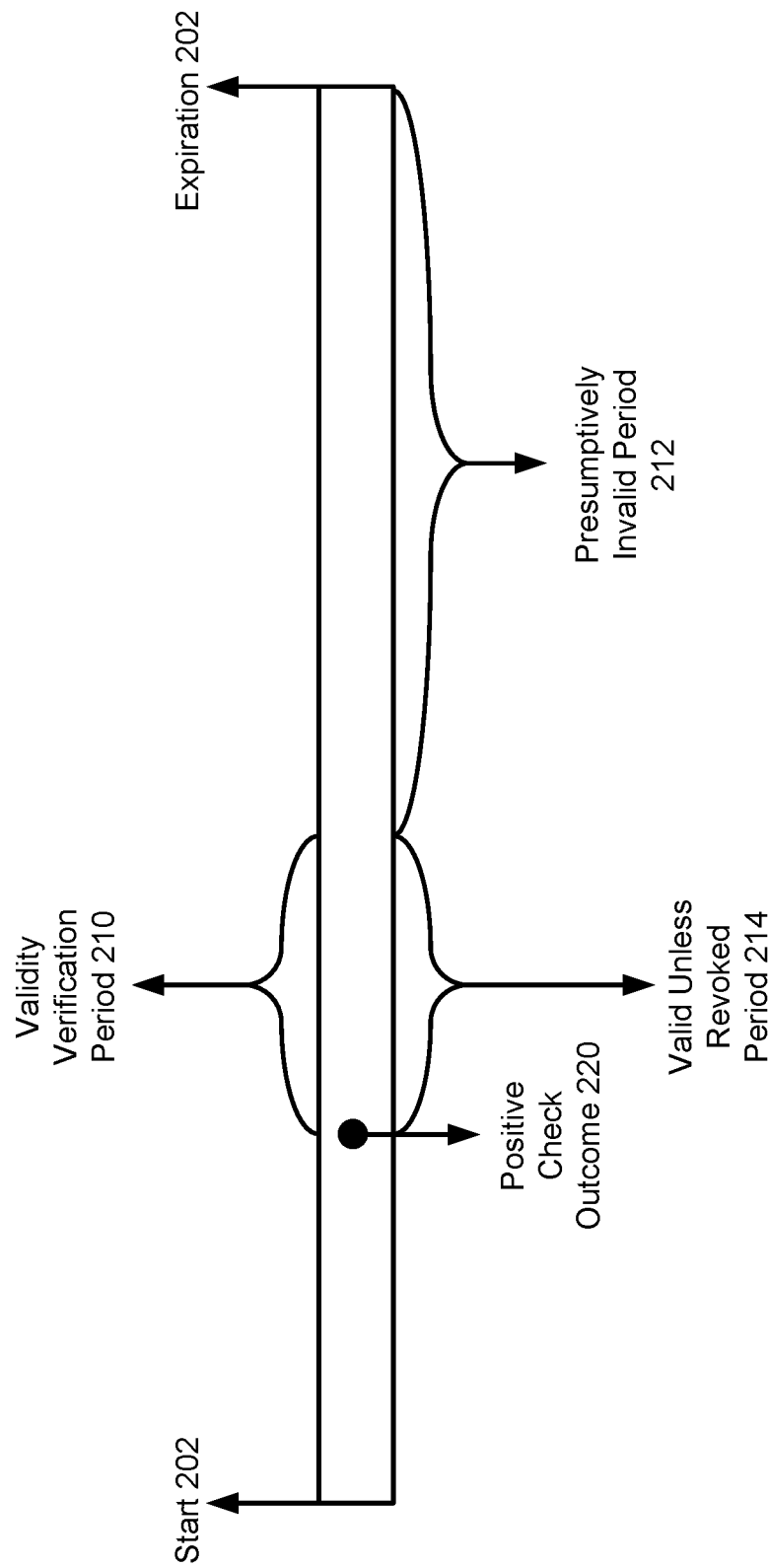

Turning to FIG. 2C, a third diagram of a lifetime of a certificate in accordance with an embodiment is shown. As seen in FIG. 2C, the data processing system may reset the validity verification period 210 to start at the completion of the check, and the presumptively invalid period to start at the end of the reset validity verification period 210.

Consequently, the valid unless revoked period 214 may also be shifted to coincide with the validity verification period 210. By doing so, the period during which the certificate will be presumed valid will be extended and the period during which the certificate will be presumed invalid will be pushed into the future.

As discussed above, various types of checks may be performed including status checks and status update checks. The outcomes of one or more of these checks may be used to determine whether to treat the certificate as valid or invalid.

Turning to FIG. 2D, a fourth diagram of a lifetime of a certificate in accordance with an embodiment is shown. As seen in FIG. 2D, a status check 222 may be performed during validity verification period 210. The status check 222 may be a check to determine whether the certificate has been revoked.

Figure 2E:
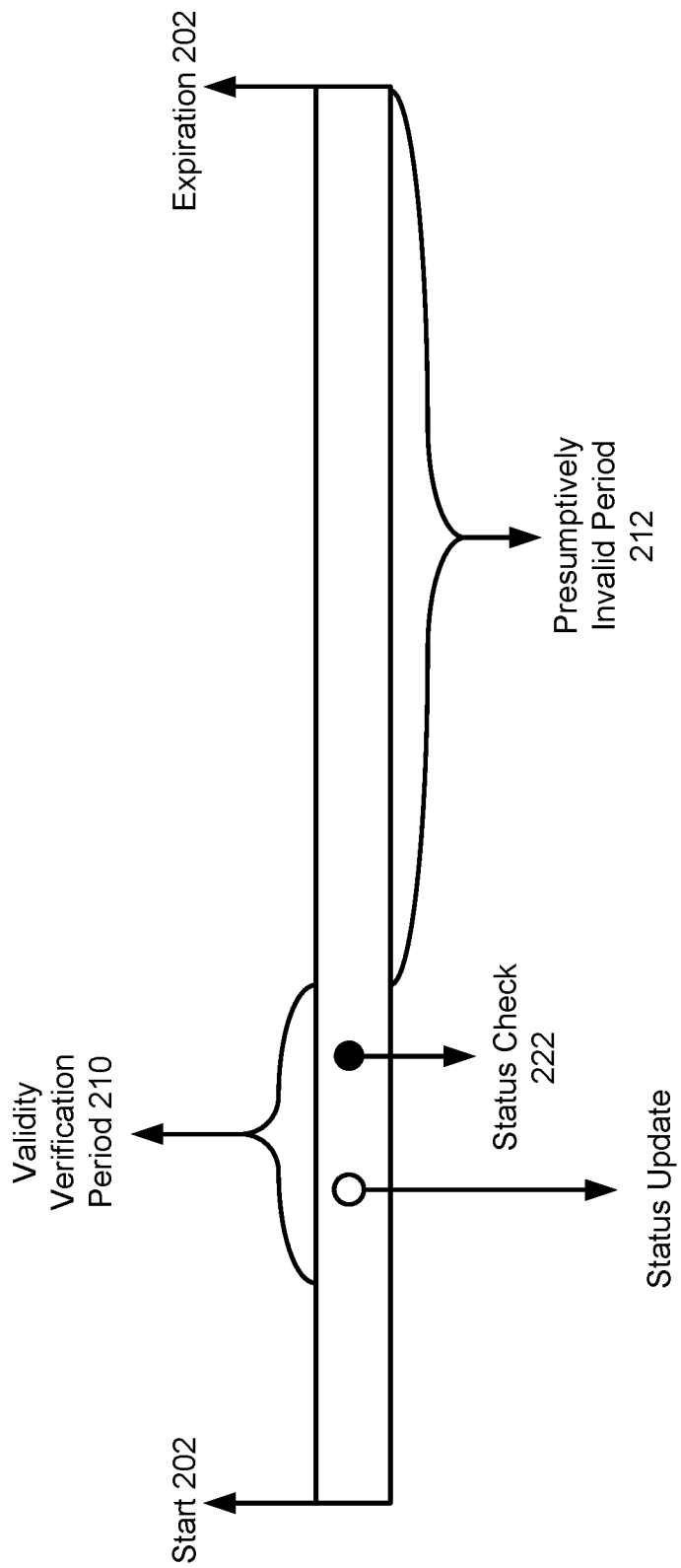

Turning to FIG. 2E, a fifth diagram of a lifetime of a certificate in accordance with an embodiment is shown. As seen in FIG. 2E, a status check 222 and a status update check 224 may be performed during validity verification period 210. The status check 222, as noted above, may be a check to determine whether the certificate has been revoked. The status update check 224 may be a check to determine whether the revocation status of the certificate has been updated by the certificate issuer during validity verification period 210. One or both of these checks may need to be performed and passed for the validity verification period 210 and presumed invalid period 212 to be reset/updated.

Figure 2F:
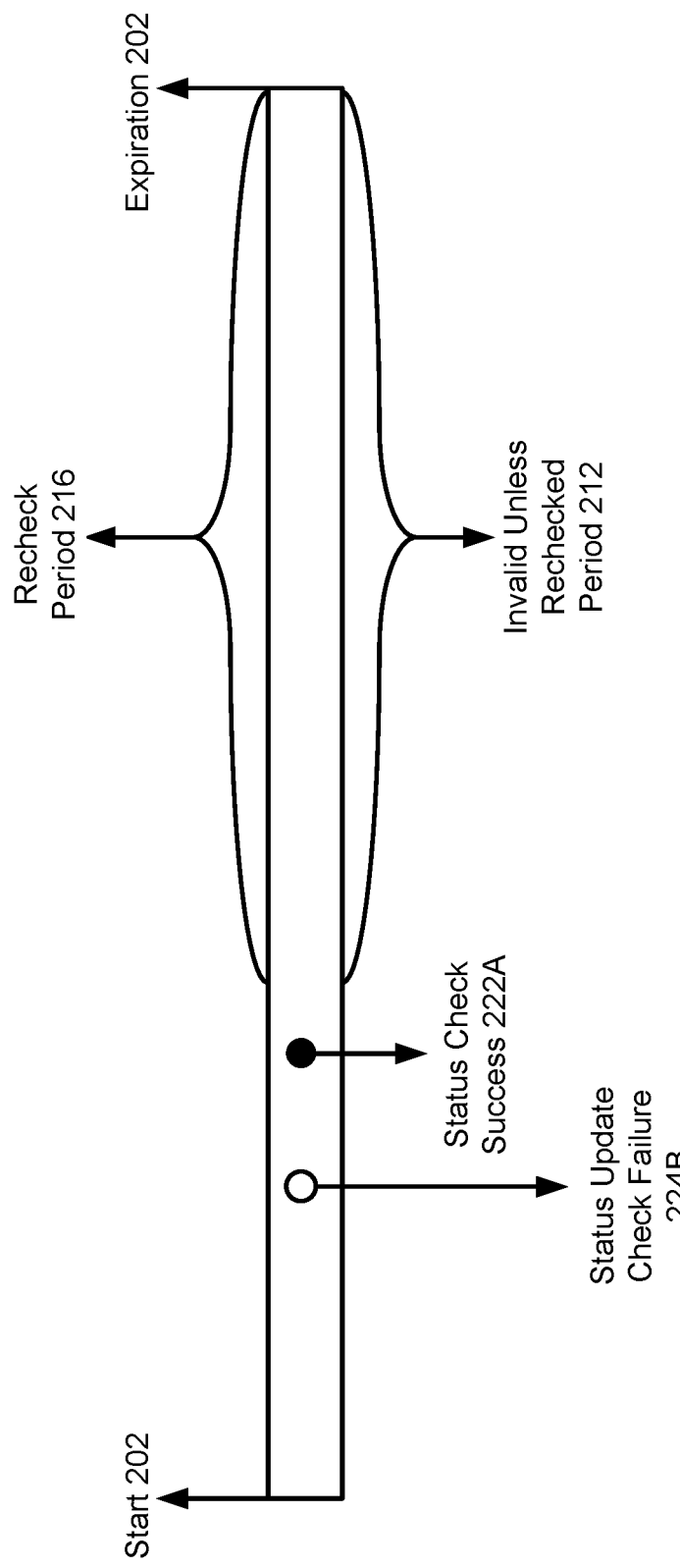

Now consider a scenario where only some of the checks are passed and others are not passed during a validity period. Turning to FIG. 2F, a sixth diagram of a lifetime of a certificate in accordance with an embodiment is shown. As seen in FIG. 2F, a status check success 222A and a status update check failure 224B has occurred. A status check success may indicate that a status check has been performed with the certificate authority and the outcome of the status check indicates that the certificate is valid. A status update check failure may indicate that a status update check has been performed with the certificate authority and the outcome of the status update check indicates that the certificate authority has not updated (e.g., reconsidered) the revocation status of the certificate, or that the status update check has not been performed.

Due to these check outcomes, the data processing system may not extend the validity verification period (not shown), which has passed in FIG. 2F. Additionally, the presumptively invalid period 212 may be converted to an invalid unless rechecked period 212. During the invalid unless rechecked period 212, the certificate may be treated as being invalid unless successful checks are performed. For example, during the invalid unless rechecked period 212, a corresponding recheck 216 period for the data processing system may be implemented in an attempt to perform the checks until successful outcomes are achieved, unless certain confirmations are obtained (e.g., multiple recheck failures), etc.

Figure 2G:
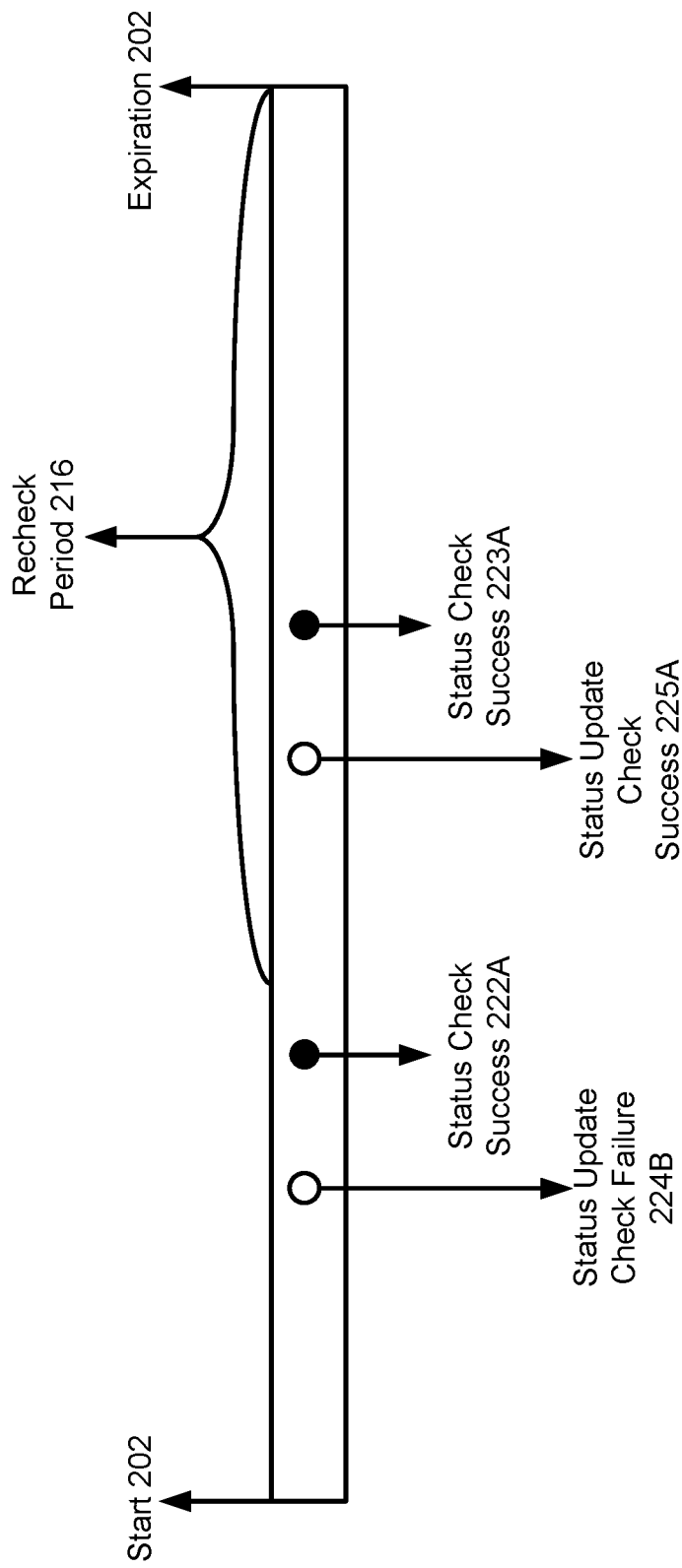

Turning to FIG. 2G, a seventh diagram of a lifetime of a certificate in accordance with an embodiment is shown. As seen in FIG. 2G, while the certificate is treated as invalid (e.g., for lack of positive outcome checks being performed during previous validity verification periods), additional status checks may be performed. For example, an additional status check (e.g., 223A) and an additional status update check (e.g., 225A) may be performed.

Figure 2H:
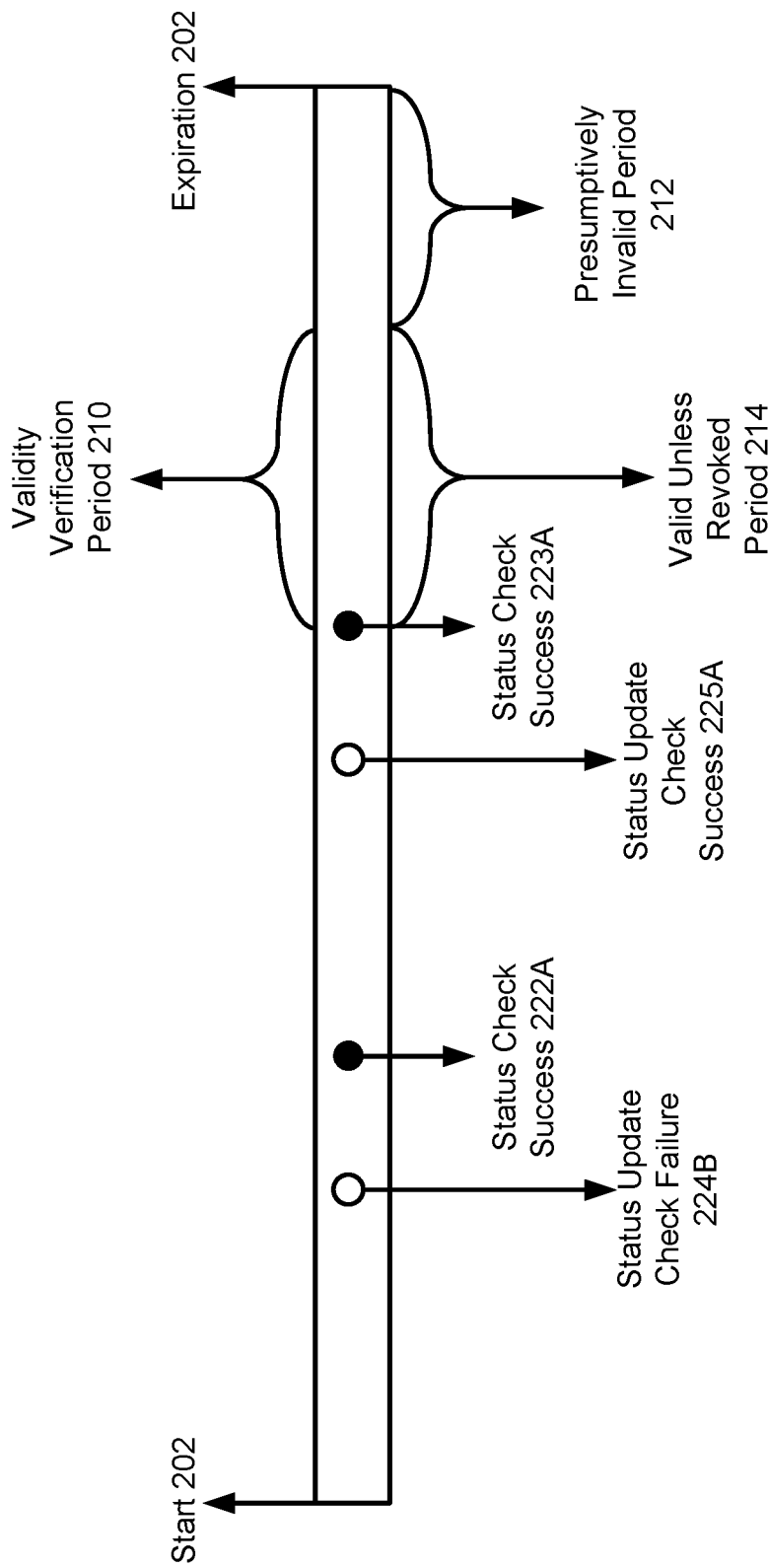

Now consider a scenario where the outcomes of these checks are both positive, as shown in FIG. 2G. Turning to FIG. 2H, an eighth diagram of a lifetime of a certificate in accordance with an embodiment is shown. As seen in FIG. 2H, following the successful checks (e.g., 223A, 225B), the data processing system may reset the validity verification period 210 and presumptively invalid period 212. Consequently, the corresponding valid unless revoked period 214 may begin immediately following the successful status checks. Accordingly, the data processing system may begin to treat the certificate as being valid again unless it is determined that it has been revoked, or successful checks are not performed prior to the presumptively invalid period 212 begins.

Thus, as illustrated in FIGS. 2A-2H, the data processing systems of FIG. 1 may manage certificates in a manner that is compensates for periods of time during which various checks cannot be performed while still ensuring that certificates are treated as invalid, prior to their expiration, as risk associated with the certificates increases.

As discussed above, the components of FIG. 1 may perform various methods to manage certificates. FIG. 3 illustrates examples of methods that may be performed by the components of FIG. 1 when providing their functionalities. In the diagrams discussed below and shown in FIGS. 3, any of the operations may be repeated, performed in different orders, and/or performed in a parallel with other operations and/or a partially overlapping in time manner with other operations.

Turning to FIG. 3, a flow diagram illustrating a method of managing certificates in accordance with an embodiment is shown. The method may be performed by a data processing system, portions thereof, or another entity. The data processing system may be a portion of a deployment, or another entity.

Prior to, during, and after the method illustrated in FIG. 3, a data processing system may be attempting to perform checks regarding certificates with a certificate issuer. These checks may succeed or fail depending on the connectivity between the data processing system and the certificate issuer. The outcomes of the checks, types of checks, and when the checks are performed may be stored for future use.

At operation 300, a service change request for a deployment is obtained. The service change request may be at operation 300, a certificate check event for a certificate is identified. The certificate check event may an event which may utilize the certificate. For example, the certificate check event may be receipt of a signed data structure that may be verified with the certificate. The certificate check event may be other types of events implicating a certificate without departing from embodiments disclosed herein.

At operation 302, a validity verification period for the certificate is identified. The validity verification period may be identified based on the last time that checks for the certificate were successfully completed. For example, the validity verification period for the certificate may follow the last time successful checks were performed. The outcomes and times of the checks may be maintained by the data processing system. Refer to FIGS. 2A-2H for additional details regarding validity verification periods.

At operation 304, one or more checks for the validity verification period are identified. The one or more checks may be identified by comparing the times associated with previously performed checks to the validity verification periods. The checks that are associated with times that fall within the validity verification period may be identified as the one or more checks.

At operation 306, it is determined whether the checks have been passed. The determination may be made by comparing the outcomes of checks to a list of outcomes that may need to have occurred. The list of outcomes may specify the outcomes of a same, or greater number, of types of checks than were identified in operation 304. If the outcomes of the checks do not match the outcomes in the list, then it may be determined that the check has not been passed.

For example, consider a scenario where list of outcomes indicates that a status check and a status update check must be passed. If only a status check has been performed and passed, then it may be determined that the checks have not passed. In another example, if a status check and status update check have both been performed but only the status check has been passed, then it may be determined that the checks have not been passed.

If it is determined that the checks have not been passed, then the method may proceed to operation 312. Otherwise the method may proceed to operation 308.

At operation 308, the certificate is treated as being valid.

At operation 310, a new validity verification period is established. The new validity verification period may follow the successful checks. The new validity verification period may be established by resetting the validity verification period. Refer to FIGS. 2A-2H for additional details regarding resetting the validity verification period. A presumed invalid period may also be updated, as described with respect to FIGS. 2A-2H.

The method may end following operation 310.

Returning to operation 306, the method may proceed to operation 312 following operation 308 when it is determined that the checks (e.g., one or more) are not passed.

At operation 312, it is determined whether the checks indicate that the certificate has been revoked. The determination may be made based on a status check identified in operation 304. The checks may indicate that the certificate has been revoked when the outcome of the status check indicates that the status of the certificate is revoked (e.g., the certificate issuer has revoked the certificate).

If it is determined that the certificate has been revoked, the method may proceed to operation 314. Otherwise the method may proceed to operation 316.

At operation 316, it is determined whether the validity validation period is over. The determination may be made by comparing the current time to the end of the validity validation period.

If it is determined that the validity validation period is over, the method may proceed to operation 318. Otherwise the method may proceed to operation 322.

At operation 318, the certificate is treated as being invalid.

At operation 320, it is attempted to remediate the checks to update the treatment of the certificate. The checks may be attempted to be remediated by performing additional checks (e.g., after the validity verification period). As discussed with respect to FIGS. 2A-2H, the performance of such checks may trigger a reset of the validity verification period, which may also change the validity state of the certification.

The method may end following operation 320.

Returning to operation 312, the method may proceed to operation 314 following operation 312 when it is determined that the checks indicate that the certificate has been revoked.

At operation 314, the certificate is treated as being invalid. The method may end following operation 314.

Returning to operation 316, the method may proceed to operation 322 when it is determined that the validity verification period is not over.

At operation 322, the certificate is treated as being valid. The method may end following operation 322.

Using the method illustrated in FIG. 3, a determination regarding whether a certificate is to be treated as valid (e.g., operation 308, 322) or invalid (e.g., operation 318, 314) may be made. The validity determination may be used to complete tasks associated with the certificate check event for the certificate.

For example, any number of actions may be predicated on the certificate being valid. If valid, then the certificate may be used to perform the actions such as, for example, verifying signed data, securing communications, and/or performing other types of actions. In contrast, if the certificate is not valid, these actions may not be performed.

To further clarify embodiments disclosed herein, now consider an example scenario as illustrated in FIGS. 4A-4F in which a business operates deployment 100 which includes data processing system 400 and data processing system 402. Data processing system 400 may operate as a control plane for data processing system 402.

Turning to FIGS. 4A-4F, diagrams illustrating actions that may be performed by components of a system similar to that of FIG. 1 in accordance with an embodiment is shown. In FIGS. 4A-4F, actions performed by various components are highlighted with numbered circles and interactions between components (e.g., data transmissions) are shown using lines terminating in arrows.

To manage the operation of deployment 100, data processing system 400, at block 1, may send a signed data structure to data processing system 402. The signed data structure may be signed with a key associated with an entity for which certificate issuer 110 has issued a certificate.

To determine whether to act on the data structure, data processing system 402, at block 2, may need to determine whether the certificate issued by certificate issuer is valid. To do so, data processing system 402 may check to see whether the certificate is expired. This this example scenario, the certificate is not expired.

Next, data processing system 402 may check to see if previously performed checks (e.g., illustrated by the arrow from block 2 toward certificate issuer 110) were passed. In this case, the checks were not passed because intermittent operable connection 106 is not operable (e.g., as indicated by the break in the line between communication system 105 and deployment 100).

Data processing system 402 may determine the period of validity verification period for the certificate and, in this scenario, determined that the validity verification period has not yet ended.

Figure 4A:
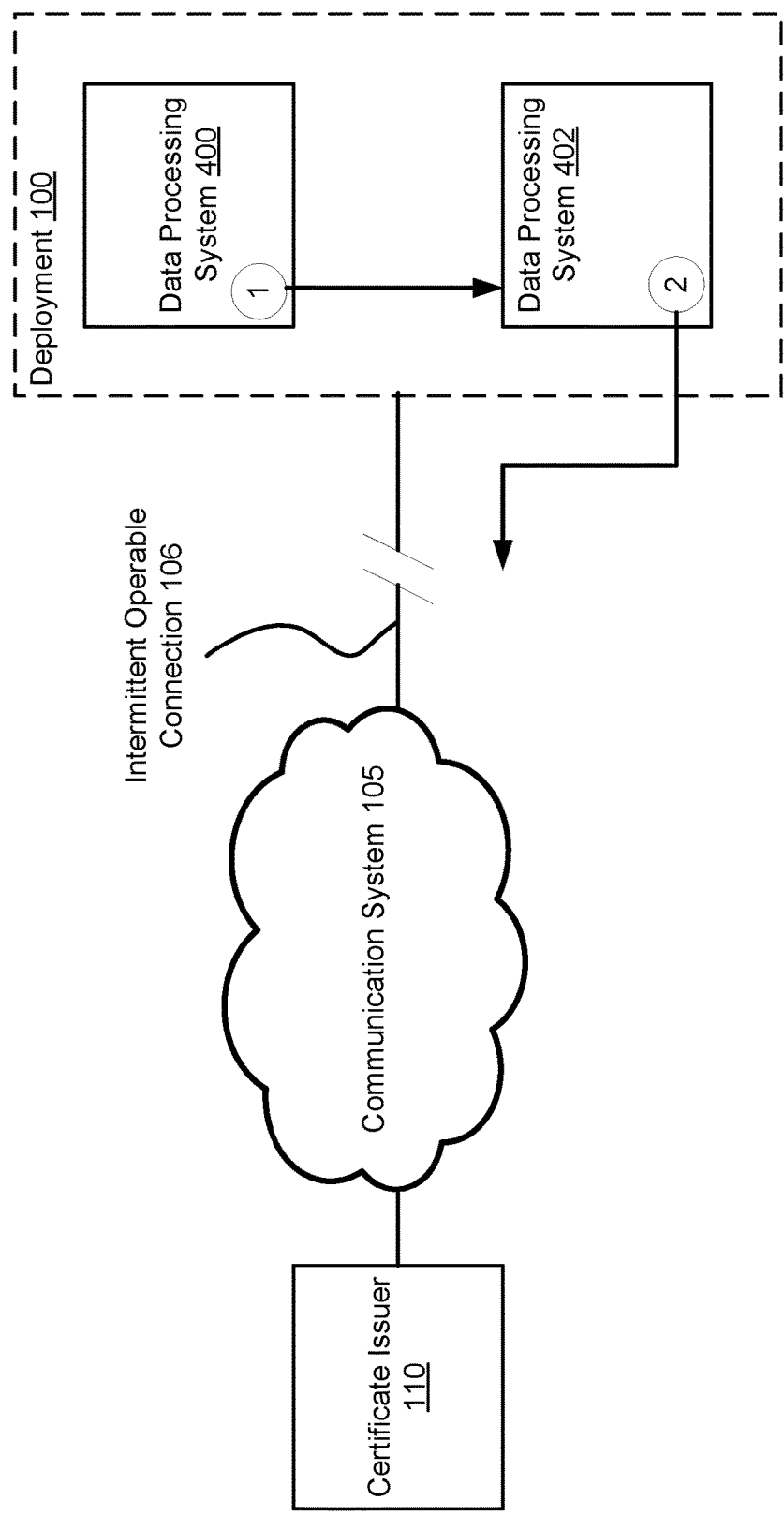
FIGS. 4A-4F show diagrams illustrating actions performed by and/or interactions between components of a system in accordance with an embodiment.
Figure 4B:
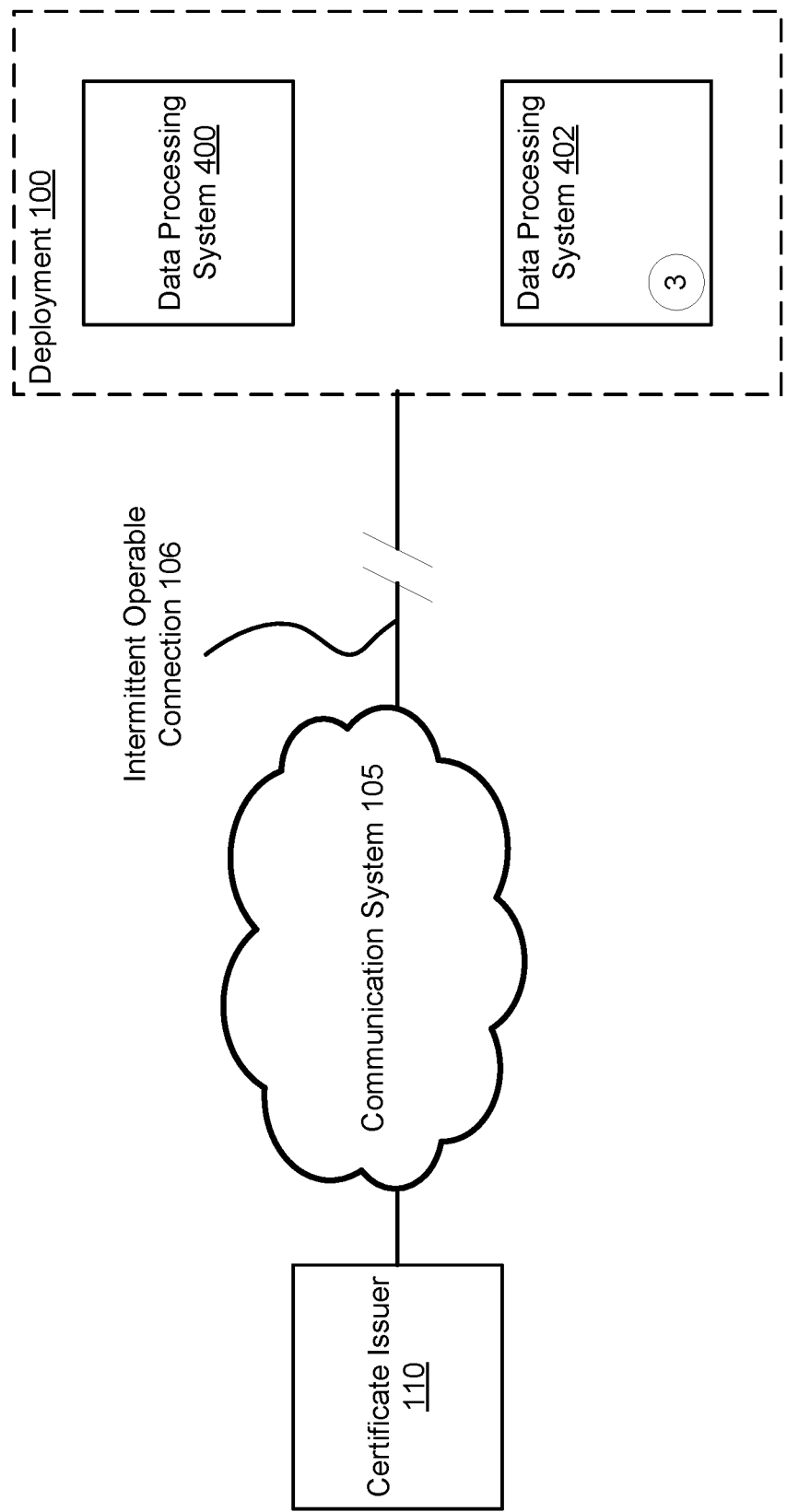

Accordingly, turning to FIG. 4B, at block 3 data processing system 402 determines that the certificate is still valid. Based on the determination, data processing system 402 uses the certificate to process the receive data structure.

Figure 4C:
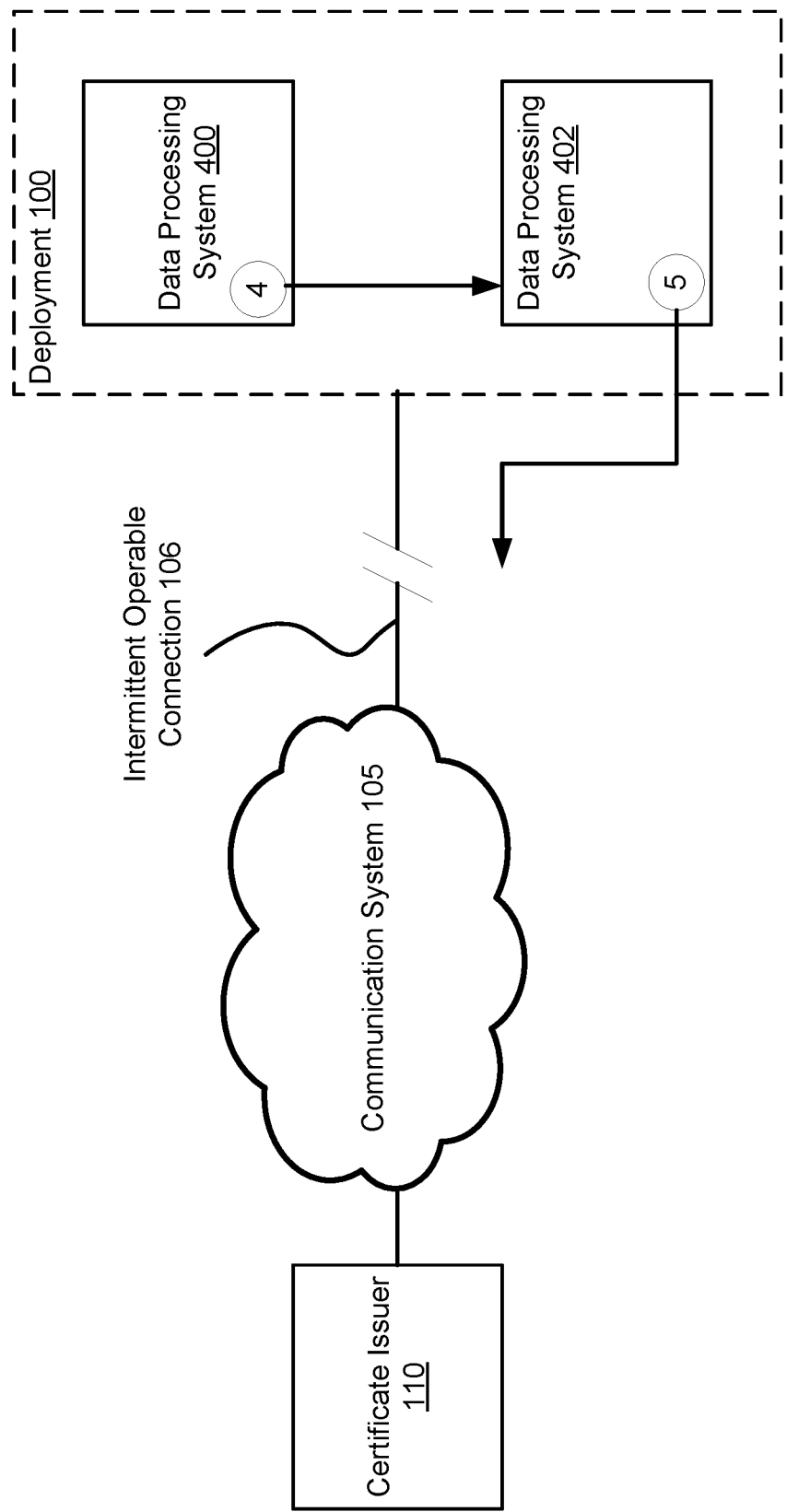

Turning to FIG. 4C, at a later point in time, data processing system 400, at block 4, may send a second signed data structure to data processing system 402. The second signed data structure may be signed with the key associated with the entity for which certificate issuer 110 has issued the certificate.

To determine whether to act on the second signed data structure, data processing system 402, at block 5, may need to determine whether the certificate issued by certificate issuer is still valid. To do so, data processing system 402 may check to see whether the certificate is expired. This this example scenario, the certificate is not expired.

Next, data processing system 402 may check to see if previously performed checks (e.g., illustrated by the arrow from block 5 toward certificate issuer 110) were passed. In this case, the checks were not passed because intermittent operable connection 106 is not operable (e.g., as indicated by the break in the line between communication system 105 and deployment 100).

Data processing system 402 may determine the period of validity verification period for the certificate and, in this scenario, determined that the validity verification period has ended.

Figure 4D:
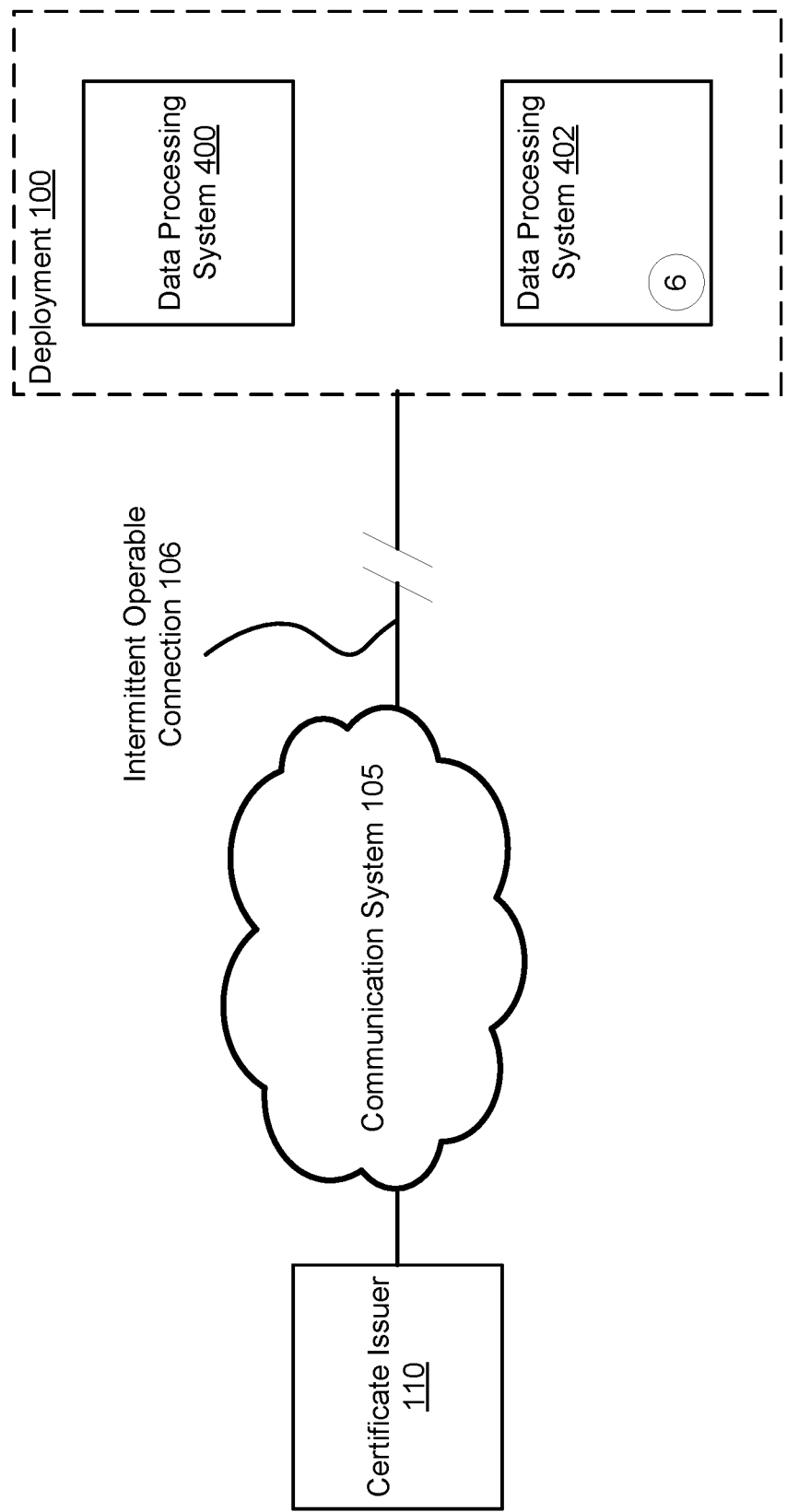

Accordingly, turning to FIG. 4D, at block 6 data processing system 402 determines that the certificate is not valid. Based on the determination, data processing system 402 does not use the certificate to process the received second data structure.

Figure 4E:
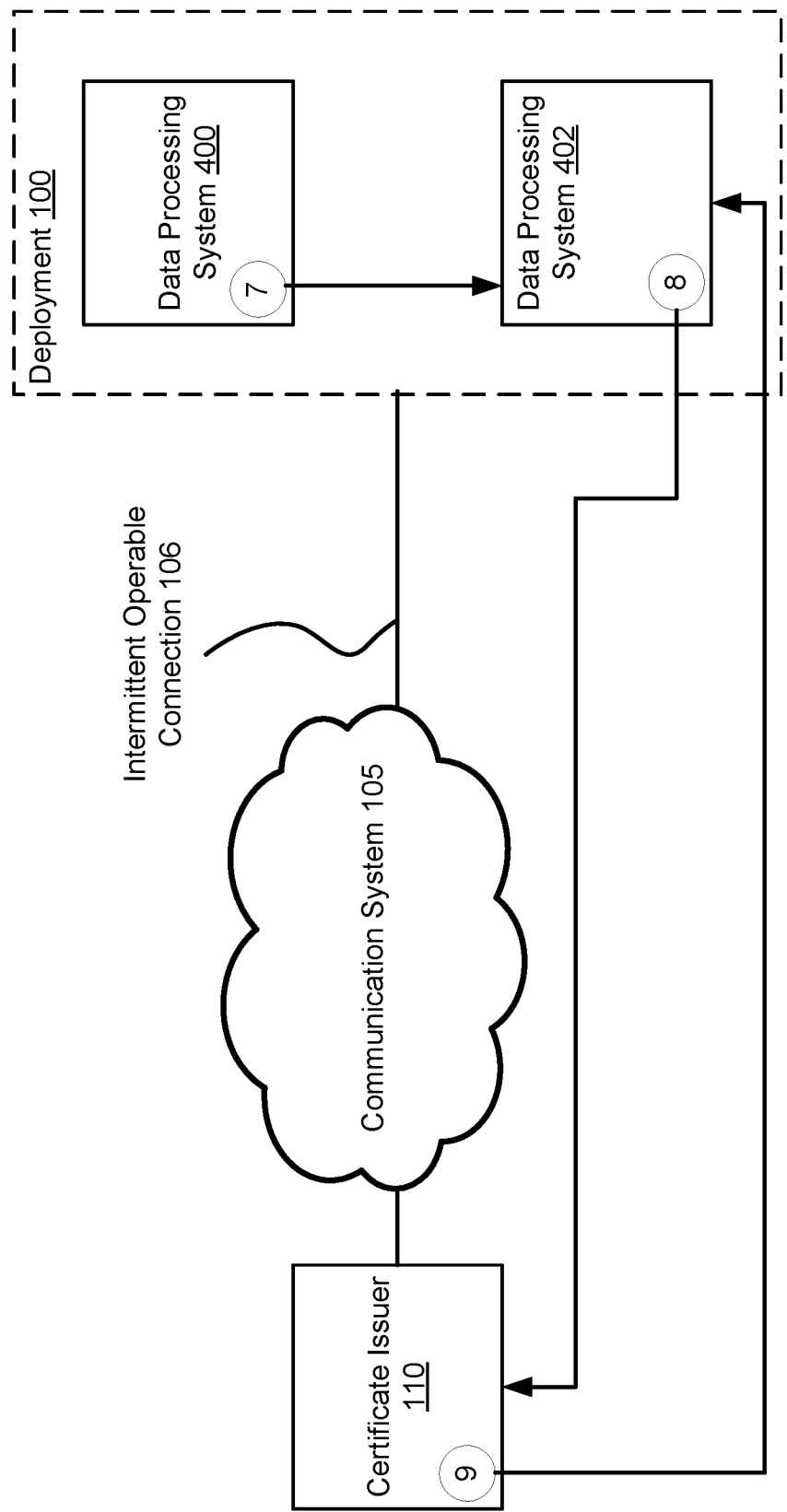

Turning to FIG. 4E, at a still later point in time, data processing system 400, at block 7, may send a third signed data structure to data processing system 402. The third signed data structure may be signed with the key associated with the entity for which certificate issuer 110 has issued the certificate.

To determine whether to act on the third signed data structure, data processing system 402, at block 8, may need to determine whether the certificate issued by certificate issuer is still valid. To do so, data processing system 402 may check to see whether the certificate is expired. This this example scenario, the certificate is not expired.

Next, data processing system 402 may check to see if previously performed checks (e.g., illustrated by the arrows from block 8 toward certificate issuer 110) were passed. In this case, the checks were passed because intermittent operable connection 106 is operable (e.g., as indicated by the solid line between communication system 105 and deployment 100). For example, certificate issuer 110, at block 9, may send a response indicating that the certificate has not been revoked.

Data processing system 402 may determine the period of validity verification period for the certificate and, in this scenario, determined that the validity verification period has ended.

Figure 4F:
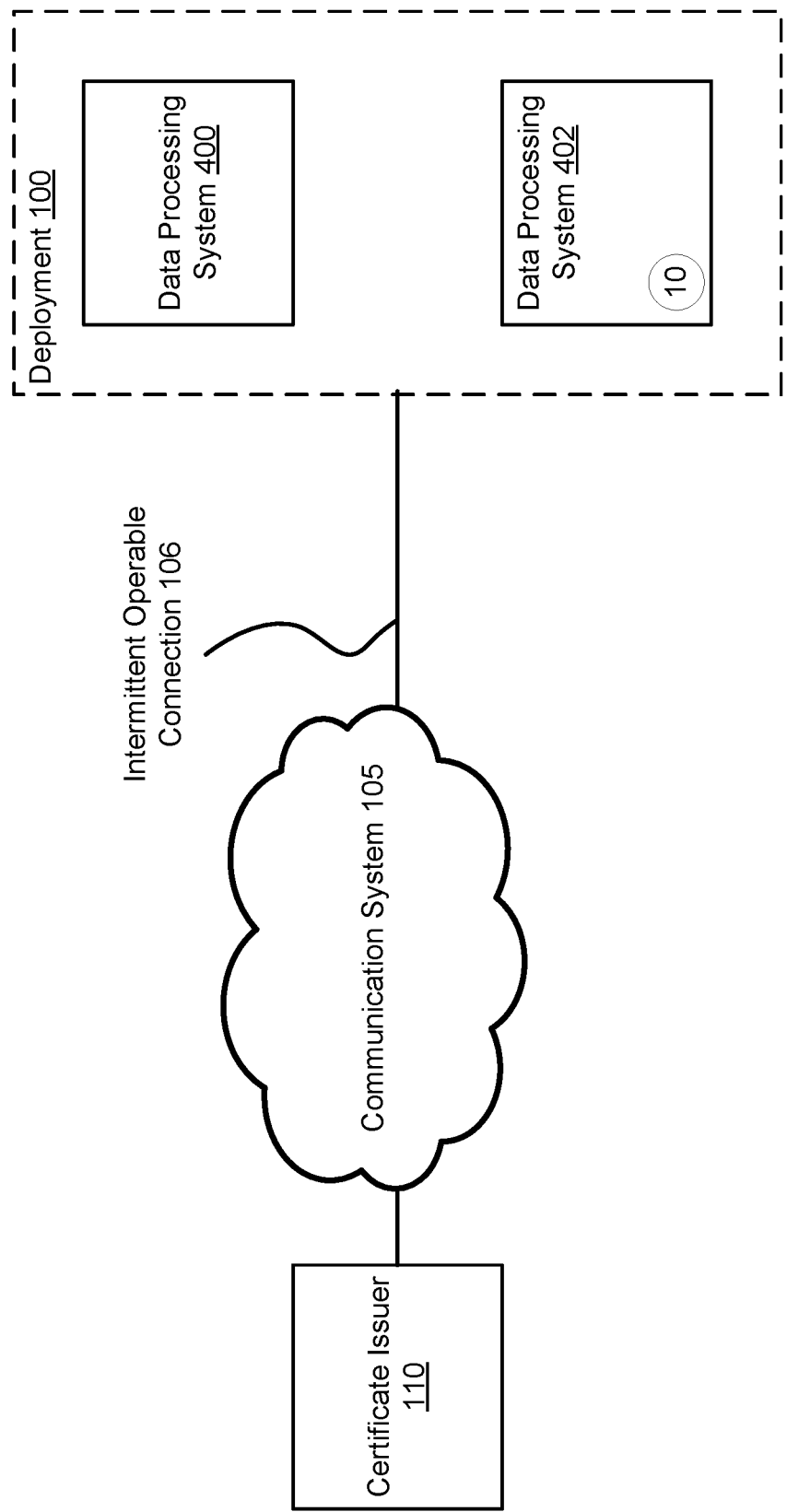

Accordingly, turning to FIG. 4F, at block 10 data processing system 402 determines that the certificate is valid, resets the validity verification period, and presumed invalid period. Based on the determination, data processing system 402 uses the certificate to process the received third data structure.

Thus, as illustrated in these figures, embodiments disclosed herein may provide a system for managing certificates that is able to compensate for periods of time during which certificate issuers may not be contacted (e.g., to identify revocation statuses of certificates), while mitigating risk by automatically revoking some certificates that have not yet expired based on their respective risk level. The validity time period may be set based on the level of risk associated with uses of revoked certificates. For example, in some cases, downstream uses of revoked certificates may cause outsized undesirable impacts while uses of other revoked certificates may cause limited undesired impacts. Consequently, the validity time period of various certificates may be customized to the level of risk to be tolerated on a granular (or macro) basis.

Figure 5:
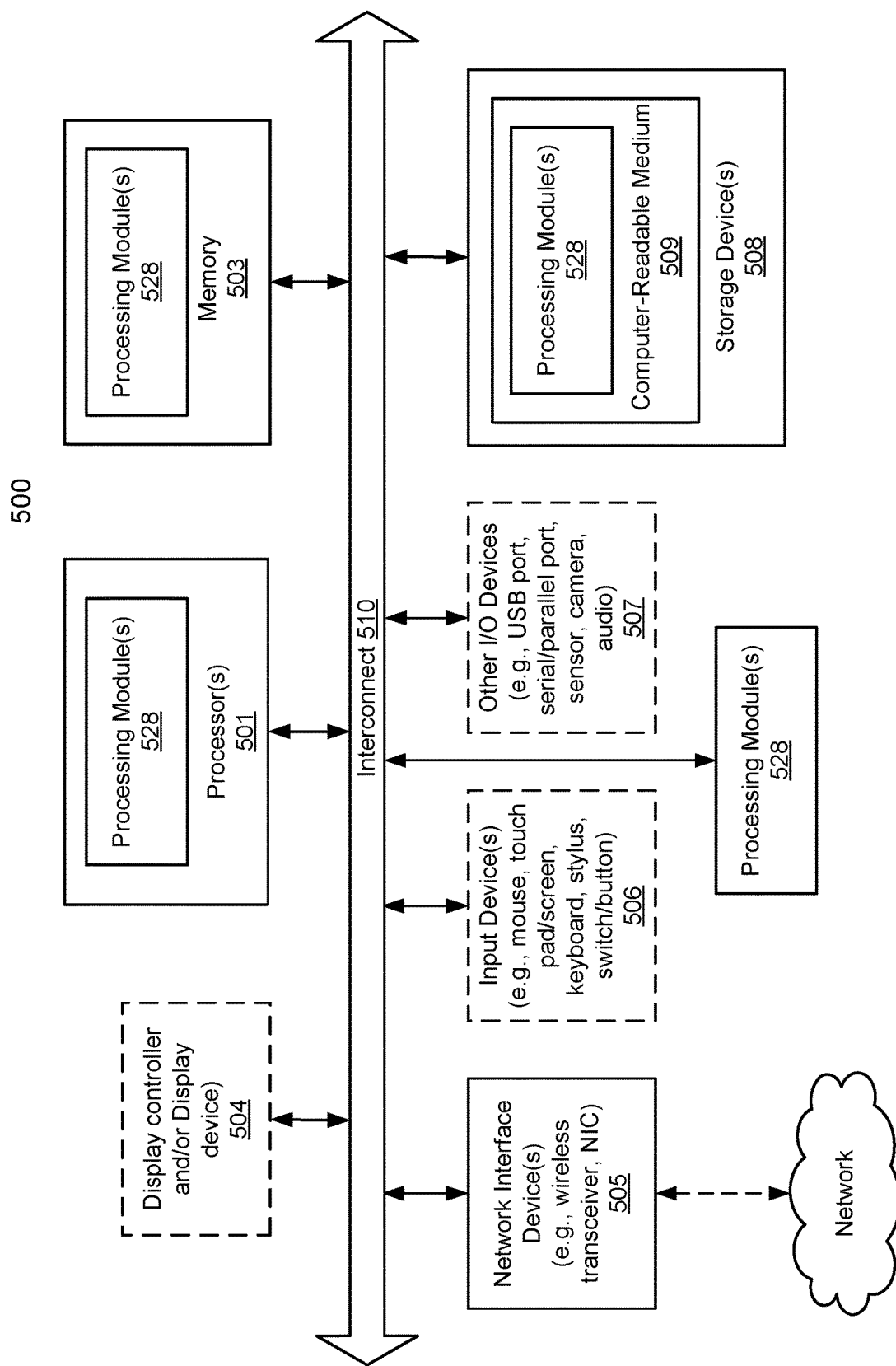
FIG. 5 shows a block diagram illustrating a data processing system in accordance with an embodiment.

Any of the components illustrated in FIGS. 1-4F may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-508 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS/iOS from Apple, Android® from Google®, Linux®, Unix®, or other real-time or embedded operating systems such as VxWorks.

System 500 may further include 10 devices such as devices (e.g., 505, 506, 507, 508) including network interface device(s) 505, optional input device(s) 506, and other optional 10 device(s) 507. Network interface device(s) 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments as described herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A computer-implemented method for managing certificates in distributed environments comprising a certificate issuer intermittently operably connected to data processing systems, the method comprising:
   identifying, by a data processing system of the data processing systems, a certificate check event for a certificate issued by the certificate issuer;
   identifying, by the data processing system, a validity verification period for the certificate, the validity verification period being different from a remaining life of the certificate;
   identifying, by the data processing system, a check to be performed during the validity verification period, the check requiring that the data processing system communicate with the certificate issuer during the validity verification period;
   making a determination, after identifying the check, that the check to be performed is not performed; and
   based on the determination:
      identifying an end of the validity verification period;
      making a second determination, based on the identified end of the validity verification period, that the validity verification period is not over;
      based on the second determination:
         treating the certificate as being valid.

2. The computer-implemented method of claim 1, further comprising:
   identifying, by the data processing system, a second certificate check event for the certificate;
   making a third determination that the check is not passed;
   based on the third determination:
      making a fourth determination, based on the identified end of the validity verification period, that the validity verification period is over;
      based on the fourth determination:
         treating the certificate as being invalid while the certificate has not expired; and
         performing an action set to attempt to remediate the check to update validity treatment of the certificate.

3. The computer-implemented method of claim 2, wherein the action set comprises:
   performing one or more actions to update an outcome of the check; and
   treating the certificate as valid when the updated outcome of the check indicates that the check is passed.

4. The computer-implemented method of claim 1, further comprising:
   identifying, by the data processing system, a second certificate check event for the certificate;
   making a third determination that the check is passed;
   based on the third determination:
      treating the certificate as being valid; and
      establishing a new validity verification period.

5. The computer-implemented method of claim 4, wherein the new validity verification period begins at a point in time associated with the check being passed and ending after an end of the validity verification period.

6. The computer-implemented method of claim 1, wherein the check comprises:
   verifying, with the certificate issuer, a revocation status of the certificate,
   wherein the check is treated as being passed when the revocation status indicates that the certificate has not been revoked, and the check is treated as not being passed when the revocation status indicates that the certificate has been revoked.

7. The computer-implemented method of claim 1, wherein the check comprises:
   verifying, with the certificate issuer, whether a revocation status of the certificate has been updated during the validity verification period,
   wherein the check is treated as being passed when the revocation status has been updated during the validity verification period, and the check is treated as being no passed when the revocation status has not been updated during the validity verification period.

8. The computer-implemented method of claim 1, wherein the check comprises:
   verifying, with the certificate issuer, a revocation status of the certificate; and
   verifying, with the certificate issuer, whether the revocation status of the certificate has been updated during the validity verification period,
   wherein the check is treated as being passed when the revocation status indicates that the certificate has not been revoked and the revocation status has been updated during the validity verification period, and the check is treated as not being passed when the revocation status indicates that the certificate has been revoked or the revocation status has not been updated during the validity verification period.

9. The computer-implemented method of claim 1, wherein the certificate check event comprises conditional performance of an action that is tied to validity of the certificate, and the check is not performed because the data processing system is unable to communicate with the certificate issuer during a portion of the validity verification period.

10. The method of claim 1, wherein during the validity verification period, the certificate is automatically presumed valid regardless of the check failing unless an outcome of the check comprises an explicit revocation of the certificate by the certificate issuer, the check failing due to at least one of the check not being performed or the outcome of the check being different from a specified outcome.

11. A non-transitory machine-readable medium having instructions stored therein, which when executed by a processor, cause the processor to perform operations for managing certificates in distributed environments comprising a certificate issuer intermittently operably connected to data processing systems, the operations comprising:
    identifying, by a data processing system of the data processing systems, a certificate check event for a certificate issued by the certificate issuer;
    identifying, by the data processing system, a validity verification period for the certificate, the validity verification period being different from a remaining life of the certificate;
    identifying, by the data processing system, a check to be performed during the validity verification period, the check requiring that the data processing system communicate with the certificate issuer during the validity verification period;
    making a determination, after identifying the check, that the check to be performed is not performed;
    based on the determination:
       identifying an end of the validity verification period;
       making a second determination, based on the identified end of the validity verification period, that the validity verification period is not over;
       based on the second determination:
          treating the certificate as being valid.

12. The non-transitory machine-readable medium of claim 11, wherein the operations further comprise:
    identifying, by the data processing system, a second certificate check event for the certificate;
    making a third determination that the check is not passed;
    based on the third determination:
       making a fourth determination, based on the identified end of the validity verification period, that the validity verification period is over;
       based on the fourth determination:
          treating the certificate as being invalid while the certificate has not expired; and
          performing an action set to attempt to remediate the check to update validity treatment of the certificate.

13. The non-transitory machine-readable medium of claim 12, wherein the action set comprises:
    performing one or more actions to update an outcome of the check; and
    treating the certificate as valid when the updated outcome of the check indicates that the check is passed.

14. The non-transitory machine-readable medium of claim 11, wherein the operations further comprise:
    identifying, by the data processing system, a second certificate check event for the certificate;
    making a third determination that the check is passed;
    based on the third determination:
       treating the certificate as being valid; and
       establishing a new validity verification period.

15. The non-transitory machine-readable medium of claim 14, wherein the new validity verification period begins at a point in time associated with the check being passed and ending after an end of the validity verification period.

16. A data processing system, comprising:
    a processor; and
    a memory coupled to the processor to store instructions, which when executed by the processor, cause the processor to perform operations for managing certificates in distributed environments comprising a certificate issuer intermittently operably connected to data processing systems, the operations comprising:
       identifying, by a data processing system of the data processing systems, a certificate check event for a certificate issued by the certificate issuer;
       identifying, by the data processing system, a validity verification period for the certificate, the validity verification period being different from a remaining life of the certificate;
       identifying, by the data processing system, a check to be performed during the validity verification period, the check requiring that the data processing system communicate with the certificate issuer during the validity verification period;
       making a determination, after identifying the check, that the check to be performed is not performed;

based on the determination:
  identifying an end of the validity verification period;
  making a second determination, based on the identified end of the validity verification period, that the validity verification period is not over;
  based on the second determination:
    treating the certificate as being valid.

17. The data processing system of claim 16, further comprising:
identifying, by the data processing system, a second certificate check event for the certificate;
making a third determination that the check is not passed;
based on the third determination:
  making a fourth determination, based on the identified end of the validity verification period, that the validity verification period is over;
  based on the fourth determination:
    treating the certificate as being invalid while the certificate has not expired; and
    performing an action set to attempt to remediate the check to update validity treatment of the certificate.

18. The data processing system of claim 17, wherein the action set comprises:
performing one or more actions to update an outcome of the check; and
treating the certificate as valid when the updated outcome of the check indicates that the check is passed.

19. The data processing system of claim 16, further comprising:
identifying, by the data processing system, a second certificate check event for the certificate;
making a third determination that the check is passed;
based on the third determination:
  treating the certificate as being valid; and
  establishing a new validity verification period.

20. The data processing system of claim 19, wherein the new validity verification period begins at a point in time associated with the check being passed and ending after an end of the validity verification period.

* * * * *